United States Patent
Hunt et al.

(10) Patent No.: US 12,081,651 B2
(45) Date of Patent: Sep. 3, 2024

(54) ONE-TIME PAD ENCRYPTION FOR INDUSTRIAL WIRELESS INSTRUMENTS

(71) Applicant: Schneider Electric Systems USA, Inc., Foxborough, MA (US)

(72) Inventors: Philip George Hunt, Bedford, MA (US); Mark V. Bertolina, Milton, MA (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 262 days.

(21) Appl. No.: 17/420,652

(22) PCT Filed: Dec. 5, 2019

(86) PCT No.: PCT/US2019/064715
§ 371 (c)(1),
(2) Date: Jul. 2, 2021

(87) PCT Pub. No.: WO2020/118071
PCT Pub. Date: Jun. 11, 2020

(65) Prior Publication Data
US 2022/0103347 A1 Mar. 31, 2022

Related U.S. Application Data

(60) Provisional application No. 62/776,284, filed on Dec. 6, 2018.

(51) Int. Cl.
*H04L 9/06* (2006.01)
*G05B 19/042* (2006.01)
(Continued)

(52) U.S. Cl.
CPC ........ *H04L 9/0656* (2013.01); *G05B 19/0425* (2013.01); *G05B 23/0283* (2013.01);
(Continued)

(58) Field of Classification Search
CPC ... H04L 9/0656; H04L 2209/805; H04L 9/12; H04L 9/14; H04L 9/16; H04W 12/03; G06F 21/60; G06F 21/602
See application file for complete search history.

(56) References Cited

U.S. PATENT DOCUMENTS 6,445,794 B1 *  9/2002  Shefi ................. G06Q 20/3829
                                                      380/46
7,242,766 B1 *  7/2007  Lyle ...................... H04L 9/3271
                                                      380/2
(Continued)

FOREIGN PATENT DOCUMENTS

| CN | 1593033 A | 3/2005 |
| CN | 105284072 A | 1/2016 |

OTHER PUBLICATIONS

Boakye-Boateng et al ("Efficient Encryption Protocol for Wireless Sensor Networks Using One-Time Pads") Apr. 18, 2016 https://ieeexplore.ieee.org/stamp/stamp.jsp?arnumber=7495438 (Year: 2016).*

(Continued)

*Primary Examiner* — Randy A Scott
(74) *Attorney, Agent, or Firm* — Locke Lord LLP

(57) ABSTRACT

Methods and systems for implementing one-time pad (OTP) encryption in industrial wireless instruments advantageously make use of data storage devices now available that can store a large number of encryption keys or pads in a small enough package to fit within an industrial wireless instrument. In some embodiments, the wireless instruments use solid-state memory devices that can easily hold a sufficient number of pads to last the expected lifetime of the wireless instruments. The solid-state memory devices are installed only during manufacturing of the wireless instruments where tamper-resistant manufacturing and assembly techniques may be used to ensure security for the pads. Likewise, the solid-state memory devices of the wireless instru- (Continued)

ments are also replaced or replenished only at an authorized manufacturer should additional pads be needed.

20 Claims, 7 Drawing Sheets

(51) Int. Cl.
    *G05B 23/02*   (2006.01)
    *G06F 8/65*    (2018.01)
    *G06T 19/00*   (2011.01)
    *H04L 9/40*    (2022.01)
    *H04W 4/38*    (2018.01)
    *H04W 12/03*   (2021.01)
    *G06F 21/60*   (2013.01)
    *H04L 9/12*    (2006.01)
    *H04L 9/14*    (2006.01)
    *H04L 9/16*    (2006.01)

(52) U.S. Cl.
    CPC .............. *G06F 8/65* (2013.01); *G06T 19/006* (2013.01); *H04L 63/107* (2013.01); *H04W 4/38* (2018.02); *H04W 12/03* (2021.01); *G06F 21/60* (2013.01); *G06F 21/602* (2013.01); *H04L 9/12* (2013.01); *H04L 9/14* (2013.01); *H04L 9/16* (2013.01); *H04L 2209/805* (2013.01)

(56) References Cited

U.S. PATENT DOCUMENTS

| 8,842,839 B2* | 9/2014 | Harrison | H04L 9/0656 |
| | | | 380/278 |
| 2008/0031456 A1* | 2/2008 | Harrison | H04L 9/0852 |
| | | | 380/278 |
| 2010/0250968 A1* | 9/2010 | Sadler | H04L 9/0863 |
| | | | 713/193 |
| 2017/0063538 A1 | 3/2017 | Sella et al. | |
| 2018/0176202 A1 | 6/2018 | Ro et al. | |

OTHER PUBLICATIONS

"An Efficient and Secure Aggregation of Encrypted Data for Wireless Sensor Network Based on Dynamic Cluster"—Huang et al, Institute of Command Automation, PLA University of Science and Technology, Sep. 2007 https://dl.acm.org/doi/pdf/10.5555/1404595.1404603 (Year: 2007).*
"The Complete Guide to Secure Communications with the One-Time Pad Cipher"—Dirk Rijmenants, Cipher Machines & Cryptology, Mar. 2011 https://cdn.ymaws.com/cicentre.com/resource/resmgr/articles/one_time_pad_v012_2011.pdf (Year: 2011).*
International Search Report for PCT Application No. PCT/US2019/064715 dated Mar. 18, 2020.
Written Opinion for PCT Application No. PCT/US2019/064715 dated Mar. 18, 2020.
Boakye-Boateng K et al., "Efficient encryption protocol for wireless sensor networks using one-time pads",2016 18th Mediterranean Electrotechnical Conference (MELECON) Apr. 18, 2016 (pp. 1-6). IEEE.
Leonardo B. Oliveira et al.: "A Security Protocol for Hierachical Sensor Networks", Proceedings of the 2004 SBRC—Simposio Brasileiro de Redes de Computadores, May 1, 2004, XP55675906, Retrieved from the internet http://citeseerx.ist.psu.edu/viewdoc/download?doi=10.1.1.333.2622&rep=rep1&1type=pdf on Mar. 12, 2020, abstract Chapter 4: "A Suite of Security Protocol for Hierarchical Sensor Networks".
Castelluccia, Claude, et al. "Efficient and provably secure aggregation of encrypted data in wireless sensor networks." ACM Transactions on Sensor Networks (TOSN), vol. 5, No. 3 (2009): 1-36.
EP Communication pursuant to Rules 161(1) and 162 EPC for EP 19849065.8 dated Jun. 7, 2021.

* cited by examiner

ONE-TIME PAD ENCRYPTION FOR INDUSTRIAL WIRELESS INSTRUMENTS

CROSS-REFERENCE TO RELATED APPLICATIONS

This application claims the benefit of priority to U.S. Provisional Patent Application No. 62/776,284, entitled "Remote Wireless Sensors and Systems Including Remote Wireless Sensors Using Automatic OTP Encryption Transmission," filed on Dec. 6, 2018, the disclosure of which is hereby incorporated by reference.

TECHNICAL FIELD

The present disclosure relates to industrial wireless instruments and, more particularly, to methods and systems for implementing one-time pad (OTP) encryption for industrial wireless instruments.

BACKGROUND

Industrial wireless instruments, such as sensors, actuators, controllers and various other industrial devices, are increasingly being used in place of wired devices. Such industrial wireless instruments offer several benefits. For one thing, industrial wireless instruments do not require cables to be run throughout a facility, thus providing a substantial savings in installation costs. These devices also provide flexibility in that they may be easily installed at any number of locations in the facility and easily relocated to any number of locations in the facility.

Each industrial wireless instrument is typically connected as a node in a wireless network that covers portions or all of the facility. The wireless instruments obtain measurements and readings of various physical parameters from equipment, machinery, and processes in the facility, then transmit the readings as data to a monitoring and control application on a regularly scheduled basis. The monitoring and control application may then analyze the data and issue commands and instructions as needed to control the equipment, machinery, and processes. The monitoring and control application can also store the data in a database and otherwise make the data available to other applications and users.

However, data transmitted wirelessly suffers from susceptibility to intercept and use by nefarious parties. Although intercept remains an issue, unauthorized use can be mitigated by encrypting the data before transmission. Encryption methods are many and varied, each with strengths and weaknesses. Examples include symmetrical encryption schemes such as Advanced Encryption Standard (AES) and Data Encryption Standard (DES), as well as asymmetrical encryption schemes that use different keys to encrypt and decrypt (e.g., public-private key encryption). These encryption schemes rely on the inability of existing computing systems to solve certain mathematical functions like factorization of large composite numbers into primes, with numbers as large as 2048 bits or more, or the inverse logarithm to some base number, within a reasonable time. Recent improvements in computing technology threaten the security of such encryption algorithms.

Accordingly, while a number of advances have been made in the field of industrial wireless instruments, it will be readily appreciated that improvements are continually needed.

SUMMARY

The present disclosure provides methods and systems for implementing one-time pad (OTP) encryption in industrial wireless instruments. The methods and systems advantageously make use of data storage devices now available that can store a large number of encryption keys or pads in a small enough package to fit within an industrial wireless instrument. In some embodiments, the wireless instruments use solid-state memory devices that can easily hold a sufficient number of pads to last the expected lifetime of the wireless instruments. In addition, the solid-state memory devices are installed only during manufacturing of the wireless instruments where tamper-resistant manufacturing and assembly techniques may be used to ensure security for the pads. This results in a wireless instrument that is physically secure and safe from unauthorized access. Likewise, the solid-state memory devices of the wireless instruments are also replaced or replenished only at an authorized manufacturer when additional pads are needed.

In general, in one aspect, embodiments of the present disclosure relate to an industrial wireless instrument equipped with one-time pad (OTP) encryption. The industrial wireless instrument comprises, among other things, a pad storage unit installed within the industrial wireless instrument and having a plurality of one-time pads stored therein, and a one-time pad controller coupled to communicate with the pad storage unit and operable to retrieve a one-time pad from the pad storage unit for each plaintext data to be encrypted. The industrial wireless instrument further comprises an arithmetic unit coupled to receive the plaintext data and the one-time pad from the one-time pad controller and operable to encrypt the plaintext data using the one-time pad. The one-time pad controller is further operable to provide the one-time pad to the arithmetic unit only once for encryption.

In accordance with any one or more of the above embodiments, the pad storage unit is a solid-state memory device, the one-time pad controller is further operable to generate a pad identifier for the one-time pad, the pad identifier identifying a location of the one-time pad in the pad storage unit, and the one-time pad controller is further operable to provide the pad identifier and a temporary pad for the pad identifier to the arithmetic unit.

In accordance with any one or more of the above embodiments, the arithmetic unit encrypts the plaintext data by performing an XOR process on the plaintext data using the one-time pad, and/or the wireless instrument is a wireless sensor and the plaintext data represents sensor readings acquired by the wireless sensor.

In general, in another aspect, embodiments of the present disclosure relate to a wireless instruments network for an industrial facility. The wireless instruments network comprises, among other things, a first industrial wireless instrument connected to acquire data from equipment in the industrial facility, the first industrial wireless instrument operable to encrypt the data using a first set of one-time pads and to transmit the encrypted data on a regular basis over a wireless link. The wireless instruments network also comprises a second industrial wireless instrument coupled to receive the encrypted data from the first wireless instrument on a regular basis, the second wireless instrument operable to decrypt the data using a second set of one-time pads and to transmit the decrypted data on a regular basis over a wired or wireless link. The wireless instruments network further comprises a gateway coupled to receive the decrypted data from the second industrial wireless instrument, wherein the first set of one-time pads and the second set of one-time pads contain identical one-time pads.

In accordance with any one or more of the above embodiments, the first and second set of one-time pads are stored in a first solid-state memory device and a second solid-state memory device, respectively, the first and second solid-state memory devices being securely installed in the first and second wireless instruments, respectively.

In accordance with any one or more of the above embodiments, the first wireless instrument is further operable to generate pad identifiers for the first set of one-time pads, each pad identifier identifying a location of each one-time pad in the first set of one-time pads, and the second wireless instrument receives the pad identifiers with the encrypted data from the first wireless instrument and is further operable to locate the one-time pads in the second set of one-time pads using the pad identifiers.

In accordance with any one or more of the above embodiments, the first wireless instrument is a wireless sensor and the encrypted data represents sensor readings acquired by the wireless sensor, the second wireless instrument is a wireless endpoint, and the first and second wireless instruments are operable to encrypt and decrypt the data, respectively, by performing an XOR process on the data using the one-time pads.

In accordance with any one or more of the above embodiments, the wireless instruments network further comprises a third wireless instrument between the first and second wireless instruments, the third wireless instrument relaying the encrypted data between the first and second wireless instruments on a regular basis.

In general, in yet another aspect, embodiments of the present disclosure relate to a method of performing one-time pad (OTP) encryption in an industrial facility. The method comprises, among other things, acquiring data from equipment in the industrial facility at a first industrial wireless instrument, and encrypting the data at the first industrial wireless instrument using a first set of one-time pads. The method also comprises transmitting the encrypted data on a regular basis over a wireless link, and receiving the encrypted data from the first wireless instrument at a second industrial wireless instrument on a regular basis. The method further comprises decrypting the data at the second wireless instrument on a regular basis using a second set of one-time pads, and transmitting the decrypted data on a regular basis over a wired or wireless link to a gateway. The first set of one-time pads and the second set of one-time pads contain identical one-time pads.

In accordance with any one or more of the above embodiments, the method further comprises storing the first and second set of one-time pads in a first solid-state memory device and a second solid-state memory device, respectively, the first and second solid-state memory devices being securely installed in the first and second wireless instruments, respectively.

In accordance with any one or more of the above embodiments, the method further comprises generating pad identifiers for the first set of one-time pads at the first wireless instrument, each pad identifier identifying a location of each one-time pad in the first set of one-time pads, and receiving the pad identifiers with the encrypted data from the first wireless instrument at the second wireless instrument receives and locating the one-time pads in the second set of one-time pads using the pad identifiers.

In accordance with any one or more of the above embodiments, the first wireless instrument is a wireless sensor and the encrypted data represents sensor readings acquired by the wireless sensor, the second wireless instrument is a wireless endpoint, and the first and second wireless instruments encrypt and decrypt the data, respectively, by performing an XOR process on the data using the one-time pads.

In accordance with any one or more of the above embodiments, the method further comprises a third wireless instrument between the first and second wireless instruments, the third wireless instrument relaying the encrypted data between the first and second wireless instruments on a regular basis.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
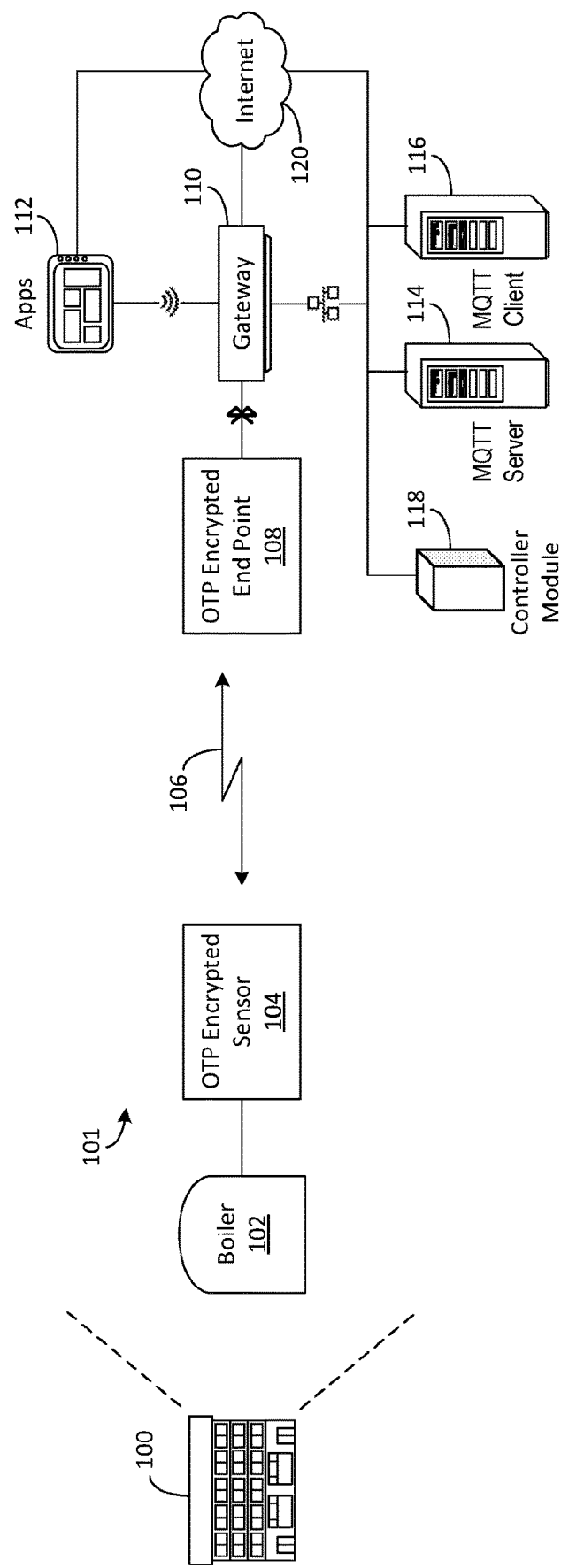
FIG. 1 is a schematic diagram illustrating an industrial facility having wireless instruments with OTP encryption according to embodiments of the present disclosure.

Referring now to FIG. 1, an exemplary industrial facility 100 is shown that employs a network 101 of wireless instruments equipped with OTP encryption capability according to some embodiments of the present disclosure. The industrial facility 100 may be any facility where wireless instruments may be suitably deployed, such as a chemical processing facility, a manufacturing facility, a warehouse facility, and the like. These facilities typically occupy a large area or space and would benefit greatly from the use of industrial wireless instruments to monitor and control facility operations. As depicted here, the industrial facility 100 can include various machinery and equipment, such as a boiler 102, that perform various processes in the facility. Multiple industrial wireless instruments may then be mounted throughout the facility to acquire measurements and readings from the facility 100. For economy, only two industrial wireless instruments are shown here at 104 and 108, with the former operating as a wireless sensor and the latter operating as a wireless receiver or endpoint. These industrial wireless instruments 104, 108 may be any type of wireless instrument capable of transmitting and receiving over a wireless connection 106. Examples of suitable industrial wireless instruments include different types of sensors, such as temperature sensors, pressure sensors, humidity sensors, light sensors, level sensors, particle sensors, proximity sensors, and the like. Preferably these wireless instruments 104, 108 can transmit and receive over the wireless connection 106 using a low energy wireless protocol like a Bluetooth Low Energy (BLE), but other wireless protocols may also be used (e.g., LowPan6, WirelessHART, Zigbee, SigFox, RPMA, etc.).

In the FIG. 1 example, the wireless instrument 104 operates as a sensor to acquire various measurements, readings, statuses, and the like relating to the boiler 102. Thereafter, the wireless instrument 104 transmits the measurements, readings, statuses, and so forth as data to the wireless instrument 108 operating as a wireless end point. The wireless instrument 108 receives the transmission, processes the data as needed, and provides the data to a gateway 110 over a wired or wireless connection. From the gateway 110, the data can be forwarded to one or more facility control systems, such as a monitoring and control application 112 (e.g., SCADA), a database server 114 (e.g., MQTT server), a client server 116 (e.g., MQTT server), a controller module 118, as well as external systems over the Internet 120.

In accordance with the disclosed embodiments, both the wireless instrument 104 and the wireless instrument 108 come equipped with OTP encryption capability. OTP encryption has been known for some time and is considered by those skilled in the art as the "perfect" secrecy mechanism if the following tenets are maintained: (i) the encryption key or "pad" is truly random; (ii) the pads are kept securely secret; and (iii) each pad is used only one time for an encryption-decryption and never reused. These tenets, however, can render OTP encryption impractical to implement in an automatic encryption application.

One difficulty in implementing automatic OTP encryption is the pad must be as long or longer than the plaintext data being encrypted. For a system that transmits data as often as once per second over an expected lifetime of 5-10 years, the size of the storage needed to securely hold a sufficient number of pads is enormous. A system capable of sending OTP encrypted data once per second for 5-10 years, for example, and doing so without having to replenish the supply of pads, would need to securely store roughly 315,360,000 messages worth of pads (i.e., 60 msg/min×60 min/hr×24 hrs/day×365 days/yr×10 yrs). Depending on how much data the system transmitted each second, the total storage needed to hold a sufficient number of pads could range on the order of around one hundred thousand Gb to as high as nine million Gb or more.

Embodiments of the present disclosure overcome the above difficulty by recognizing two insights: 1) industrial wireless instruments usually transmit comparatively small amounts of data, and 2) data storage devices can now hold the needed number of pads in a small enough package to fit within an industrial wireless instrument. Typical industrial wireless instruments transmit as little as a single data message per second, each message occupying as little as a few dozen bytes of data, and therefore the pad storage requirement is considerably smaller even assuming a 10-year life span for the instrument in the field. For example, a wireless instrument sending 20 bytes of data every second for 10 years would require about 50 Gb of pads (i.e., 315,360,000 msg×20 bytes/msg×8 bits/byte=50,457,600,000 bits). This is well within the capacity of several existing data storage technologies. For example, solid-state memory chips currently available from manufacturers like Micron, Samsung, Intel, and others can easily hold 50 Gb of pads in a single chip.

A solid-state memory device refers to a device that stores data without using any moving parts, in contrast to traditional electromechanical disks. Solid-state memory devices are typically implemented in semiconductor materials. Examples include nonvolatile memory devices, such as Flash (e.g., NAND, NOR, etc.), MRAM, PCRAM, ReRAM, as well as volatile memory devices, such as DRAM and SRAM, that are arranged in a persistent memory architecture, along with one-time-programmable memories (e.g., ROM, PROM, etc.). And new technologies like holographic storage hold the potential to overtake many existing data storage technologies in both capacity and speed. The wireless instruments disclosed herein can accordingly implement automatic OTP encryption (and decryption) using solid-state memory devices or other existing storage technologies as well as future storage technologies once they become available.

Figure 2:
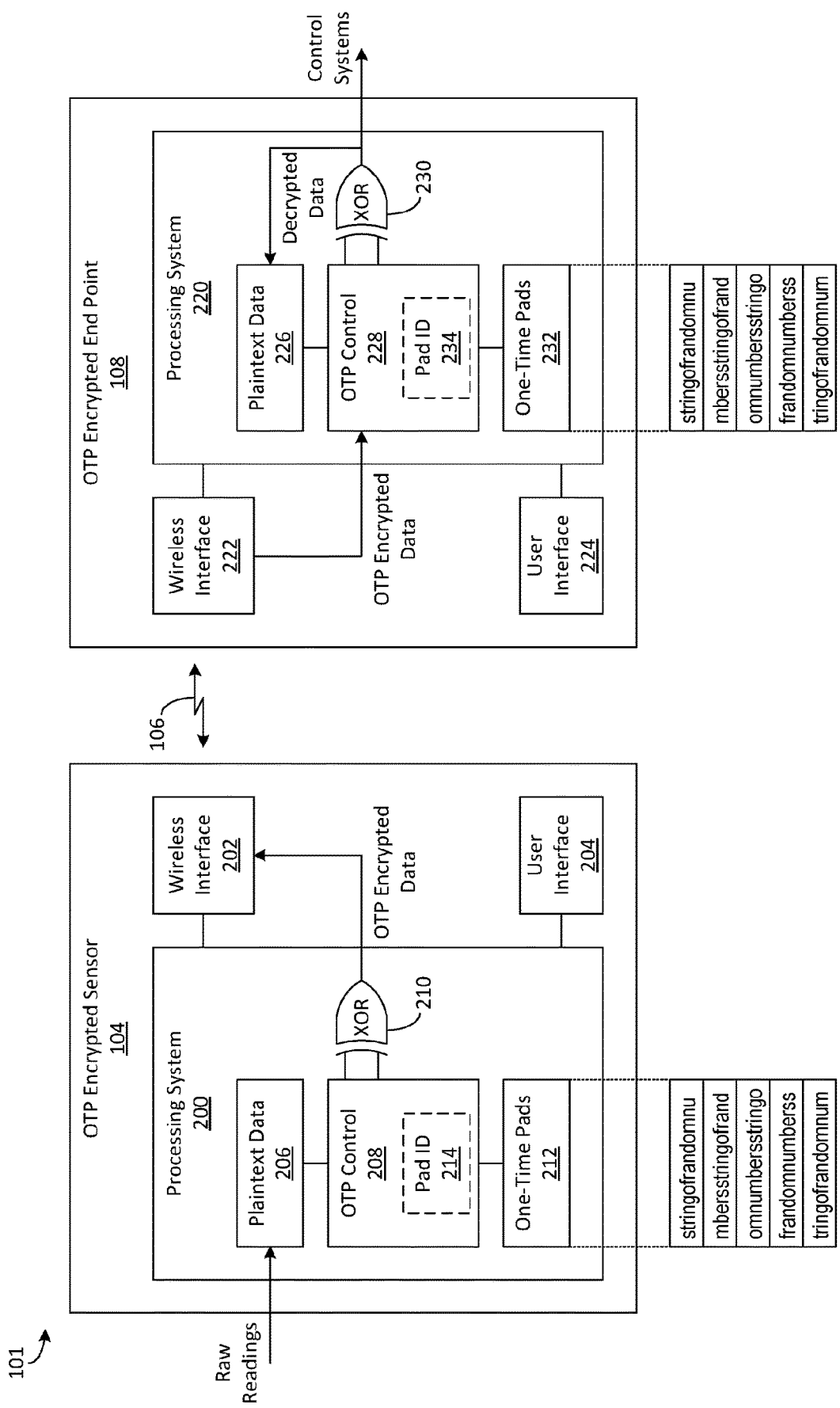
FIG. 2 is a block diagram illustrating exemplary wireless instruments with OTP encryption capability according to embodiments of the disclosure.

FIG. 2 shows a block diagram illustrating exemplary implementations of the industrial wireless instruments 104 and 108 from FIG. 1 according to embodiments of the disclosure. As can be seen, both devices 104 and 108 come equipped with OTP encryption capability that work in a similar manner. Referring first to the wireless instrument 104, there is an on-board processing system 200, a wireless interface 202, and a user interface 204, among other components. The processing system 200 performs automatic data processing and related tasks for the wireless instrument 104, while the wireless interface 202 allows the wireless instrument 104 to transmit and receive data messages over the wireless connection 106, and the user interface 204 allows the wireless instrument 104 to interact with and be controlled by users.

In addition to data processing and related tasks, the processing system 200 also performs automatic OTP encryption of the data transmitted by the wireless instrument 104. To this end, the processing system 200 includes a plaintext data module 206, an OTP control module 208, a modular arithmetic unit 210, and a one-time pad storage 212. In preferred embodiments, the modular arithmetic unit 210 has the functionality of an Exclusive-OR unit, or XOR unit, and may reside within the OTP control module 208 instead of as a discrete component. Indeed, it should be understood all functional components herein are depicted individually for illustrative purposes only, and the various components may be integrated into one or more super components and/or divided into several constituent components within the scope of the present disclosure.

In general, the plaintext data module 206 operates to process raw measurements and readings acquired by the wireless instruments 104 (e.g., from the boiler 102) and transform such raw readings into plaintext data. The transformation may involve, for example, filtering, smoothing, and converting the raw readings from analog to digital format. Conversion preferably conforms the plaintext data to a particular data type for each raw reading type, for example, temperature data, pressure data, flow rate data, and the like. The plaintext data is then provided to the OTP control module 208 for encryption.

Encryption involves the OTP control module 208 retrieving a pad from a set of one-time pads in the pad storage 212 and inputting the pad and the plaintext data into the modular arithmetic unit 210. Recall from above that the pad must be at least as long as (or longer) than the plaintext data. The OTP control module 208 thus pairs or otherwise arranges the plaintext data and the pad into predefined blocks that each have the same size, such as one-byte blocks, two-byte blocks, four-byte blocks, and the like, for input into the modular arithmetic unit 210. The modular arithmetic unit 210 then encrypts the plaintext data by XORing each data block with a corresponding pad block, typically on a bit-by-bit basis, to produce OTP encrypted data.

Importantly, once a given pad block has been used, the OTP control module 208 moves to a different pad block in the pad storage 212 and either erases or takes appropriate steps to avoid or prevent reuse of the previous pad block for encryption. This may involve the OTP control module 208 moving to the next sequential pad block in the pad storage 212 and marking the immediately preceding block as already used or invalid. It is also possible for the OTP control module 208 to move to a non-sequential pad block as the next pad block so long as the locations of used and unused pad blocks can be tracked in the pad storage 212.

The pad storage 212, in some embodiments, uses solid-state memory to store the pads. As mentioned earlier, currently available solid-state memory devices (e.g., Flash) can easily hold a sufficient number of pads to last the expected lifetime of the wireless instrument 104 without reusing or replenishing the pads. This allows the wireless instrument 104 to satisfy OTP encryption tenet (iii) above. And because the pads also need to satisfy tenet (ii) above, in some embodiments, the solid-state memory of the pad storage 212 is installed only during manufacturing of the wireless instrument 104 where tamper-resistant manufacturing and assembly techniques may be used to seal the wireless instrument 104. This produces a wireless instrument 104 that is physically secure and safe from access by an unauthorized third party. For the same reason, the solid-state memory of the pad storage 212 is also replaced or replenished only at the manufacturer when additional pads are needed. As for tenet (i), any of several suitable random-number generators known to those skilled in the art may be used to generate highly random pads.

In some embodiments, a pad ID manager 214 may be provided in the OTP control module 208 to track the location of the pad blocks retrieved from the pad storage 212. The pad ID manager 214, which may resemble a memory management function of the OTP control module 208 in some embodiments, generates a pad identifier that tells the control module 208 where in the pad storage 212 to retrieve the next pad block. The pad identifier may take any suitable form, such as a logical address or pointer to a particular memory location in the pad storage 212, or an offset from the beginning or the end of the pad storage 212, and the like. Such a pad identifier is particularly useful for applications of the wireless instrument 104 where the size of the pad block needs to change (i.e., increase or decrease) to accommodate a change in plaintext data block size transmitted to the wireless instrument 108.

In some embodiments, the pad identifier may be appended to or otherwise included with the OTP encrypted data and transmitted to the wireless instrument 108. The pad identifier is preferably transmitted without OTP encryption to allow the wireless instrument 108 to easily extract and use the pad identifier to correctly locate a pad. This helps ensure the wireless instrument 108 uses the same pad to decrypt the data as was by the wireless instrument 104 to encrypt the data. It is of course possible to synchronize the wireless instrument 104 and the wireless instrument 108, for example, by requiring the same block size be used throughout in both devices, so that the pad identifier need not be included with the encrypted data.

At the wireless instrument 108, a wireless interface 222 receives the OTP encrypted data from the wireless instrument 104 and provides the data to a processing system 220 for automatic decryption. To this end, the processing system 220 of the wireless interface 222 has essentially the same components as the processing system 200 of the wireless instrument 104, including a plaintext data module 226, an OTP control module 228, a modular arithmetic unit 230, and a one-time pad storage 232. Indeed, the pad storage 232 of the wireless instrument 108 and the pad storage 212 of the wireless instrument 104 must contain identical pads, preferably stored in the same sequence within the same or similar solid-state memory devices. And the pad storage 232 of the wireless instrument 108 is also installed during manufacturing to ensure secrecy and security of the pads.

Decryption involves the OTP control module 228 retrieving a pad from among a set of one-time pads in the pad storage 232 having the same (or larger) size as the encrypted data and inputting the pad and the encrypted data into the modular arithmetic unit 230. The OTP control module 228 also ensures that the retrieved pad can no longer be used for decryption, for example, by erasing the pad or designating the pad as previously used or invalid. Where a pad identifier is included with the encrypted data received from the wireless instrument 104, the OTP control module 228 extracts and uses the pad identifier to locate the pad in the pad storage 232. If no pad identifier is included, the OTP control module 228 relies on synchronization between the wireless instrument 104 and the wireless instrument 108 to locate the pad in the pad storage 232. The OTP control module 228 then pairs or otherwise arranges the encrypted data and the pad into predefined blocks that have the same size as one another and inputs them into the modular arithmetic unit 230. The modular arithmetic unit 230 thereafter decrypts the encrypted data by XORing the data with the corresponding pad to produce the plaintext data.

After decryption, the wireless instrument 108 may forward the plaintext data via the gateway 110 (FIG. 1) to one or more control systems over a wired or wireless connection as needed. A user interface 224 allows the wireless instrument 108 to interact with and be controlled by users as needed.

Figure 3:
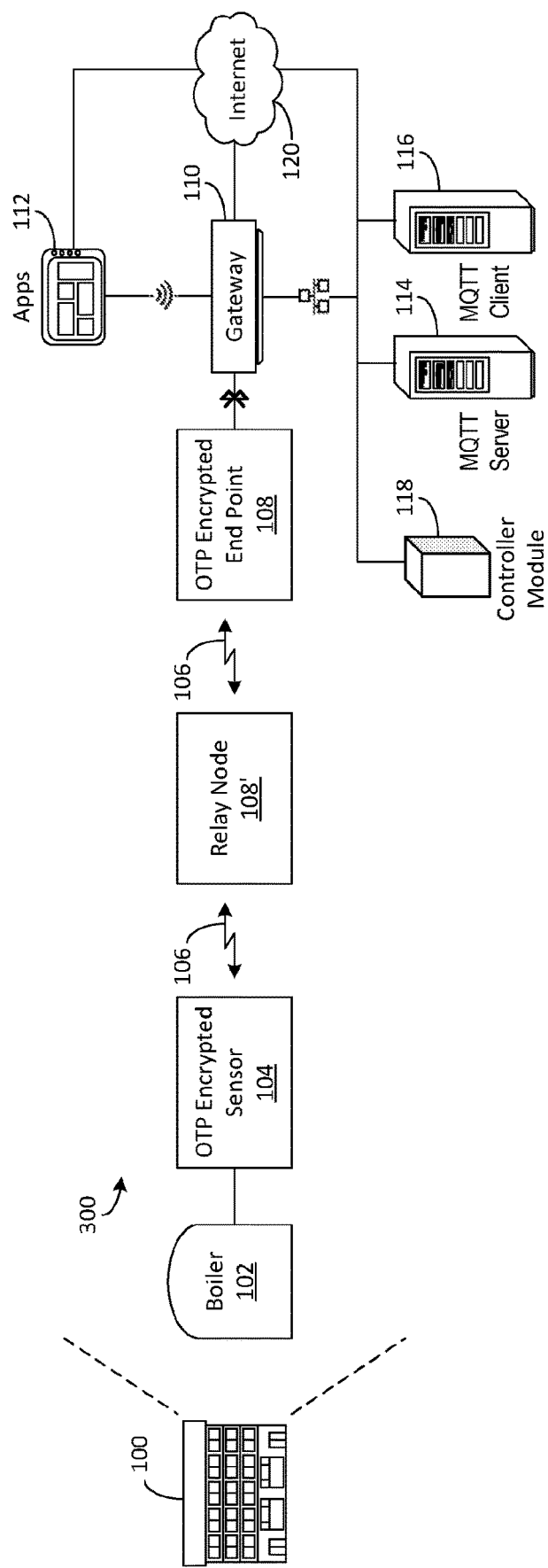
FIG. 3 is a schematic diagram illustrating another industrial facility employing wireless instruments with OTP encryption according to embodiments of the disclosure.

In some embodiments, one or more relay nodes may be inserted between the wireless instrument 104 and the wireless instrument 108 to extend the range of the network 101 (FIG. 1). This scenario is depicted in FIG. 3, where an industrial wireless instruments network 300 is shown in which another wireless instrument 108' now acts as a relay node between the wireless instrument 104 and the wireless instrument 108. In these embodiments, the OTP decryption capability of the relay node 108' may be turned off so that the relay node 108' simply relays any data received without decrypting or re-encrypting the data.

In some embodiments, however, it is possible for the second wireless instrument/relay node 108' to decrypt the encrypted data from the wireless instrument 104 first, then re-encrypt the data before relaying the data to the downstream wireless instrument 108. In such embodiments, the OTP control module of the relay node 108' may operate to encrypt the plaintext data for the downstream wireless instrument 108 in a similar manner as described above, taking care to avoid using pads that were previously used for decryption. For example, the OTP control module of the relay node may move sequentially from the beginning to the end of the pad storage for decryption pads, while moving sequentially from the end to the beginning of the pad storage for encryption pads, or vice versa, so long as all devices in the network 300 are so synchronized. Alternative arrangements for satisfying OTP tenet (iii) may be derived by those skilled in the art within the scope of the present disclosure.

Figure 4:
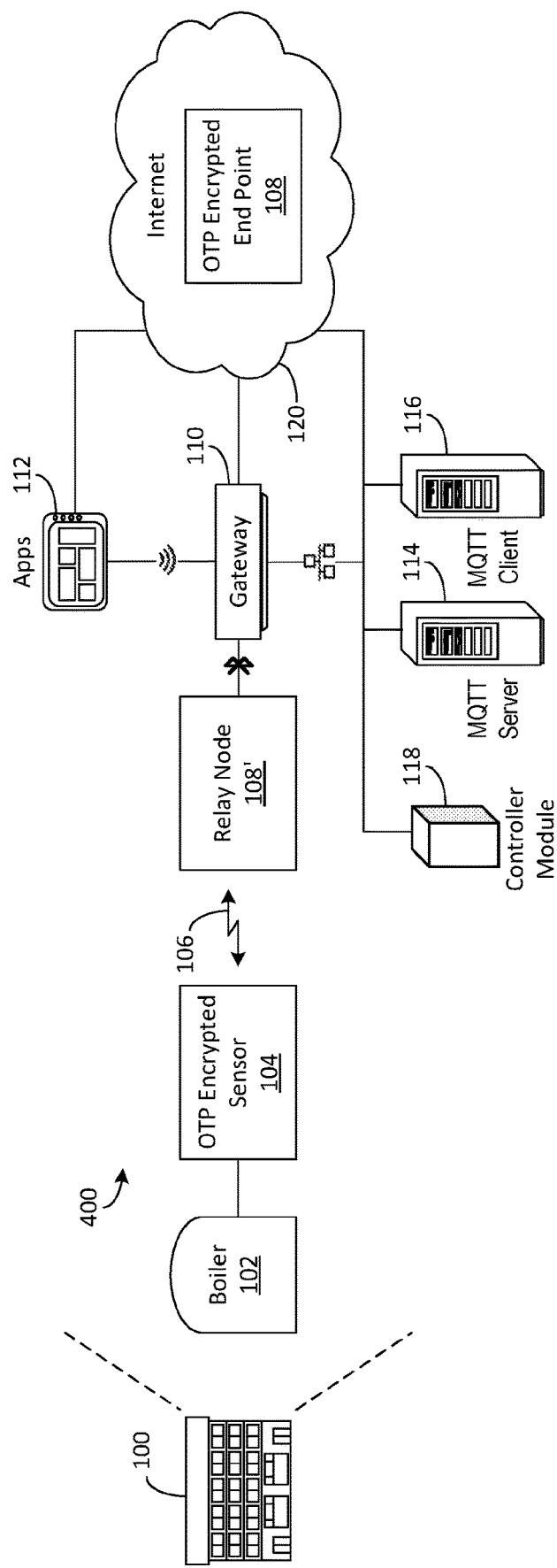
FIG. 4 is a schematic diagram illustrating yet another industrial facility employing wireless instruments with OTP encryption according to some embodiments.

FIG. 4 illustrates another industrial wireless instruments network 400 in which OTP decryption occurs within or at some point beyond the gateway 110 instead of beforehand. Thus, in some embodiments, the wireless instrument 108 may reside on the Internet 120, for example, or at some other desired location beyond the gateway 110. In these embodiments, a relay node such as the relay node 108' may act as an endpoint to relay data from the wireless instrument 104 to the gateway 110 without decryption. Decryption may then be performed in the manner described above once the data reaches the wireless instrument 108. Indeed, in such embodiments, and in all other embodiments described herein, a wired instrument having the described OTP encryption capability may be used to transmit and receive data over a suitable wired protocol (e.g., HART) instead of a wireless instrument.

Figure 5:
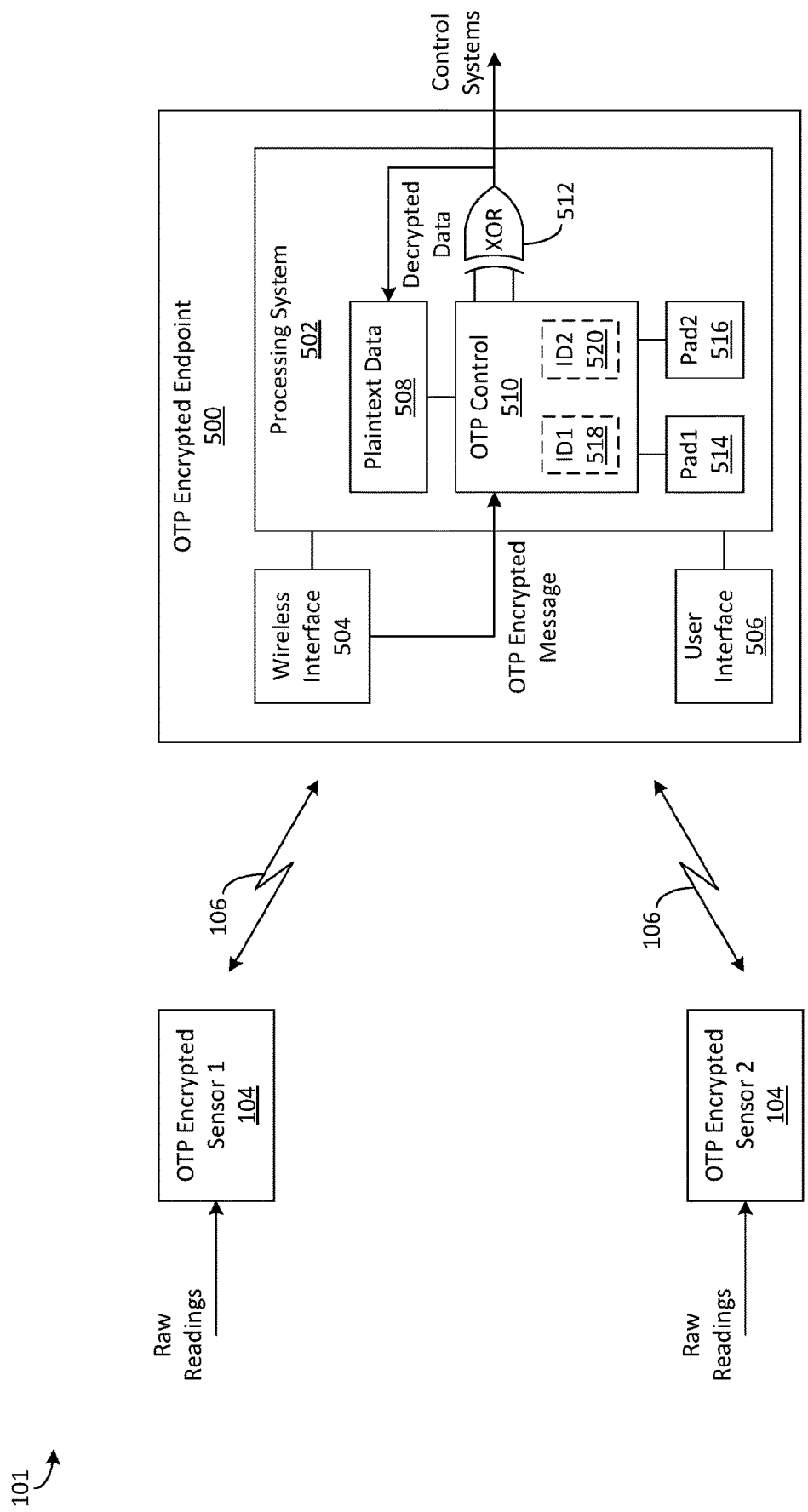
FIG. 5 is a block diagram illustrating another exemplary wireless instrument with OTP encryption capability according to embodiments of the disclosure.

FIG. 5 shows a block diagram for an exemplary wireless instrument 500 that can act as an endpoint to support multiple wireless instruments 104 concurrently according to embodiments of the present disclosure. The wireless instruments 104 are labeled here as OTP Encrypted Instrument 1 and OTP Encrypted Instrument 2 for ease of reference, each wireless instrument 104 having a different pad storage from the other wireless instruments 104. Matching pad storages are then installed in the wireless instrument 500 to accommodate the pad storages in the multiple wireless instruments.

As can be seen, the wireless instrument 500 has an on-board processing system 502, a wireless interface 504, and a user interface 506 that operate in much the same manner as their counterparts in the wireless instrument 108 (FIG. 2). The processing system 502 further includes a plaintext data module 508, an OTP control module 510, and a modular arithmetic unit 512, that likewise operate in much the same manner as their counterparts in the wireless instrument 108. However, instead of a single pad storage, the wireless instrument 500 has multiple pad storages 514 and 516, each corresponding to (i.e., storing the same pads as) one of the pad storages in the multiple wireless instruments 104. Each pad storage 514 and 516 may be implemented using a separate solid-state memory chip, or several pad storages 514 and 516 may be implemented using a single chip with large enough capacity. In either case, this allows the wireless instrument 500 to support multiple wireless instruments 104 while maintaining compliance with the OTP tenets mentioned above. In some embodiments, pad ID managers 518 and 520 may also be provided in the OTP control module 510 to track the location of the pad blocks retrieved from the pad storages 514 and 516, respectively.

Figure 6A:
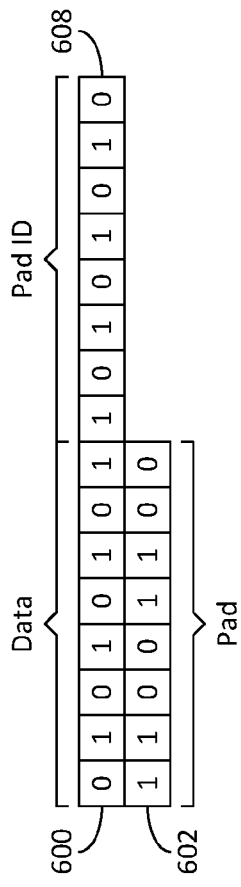
FIGS. 6A-6D are data blocks illustrating exemplary plaintext blocks and exemplary pad blocks according to embodiments of the disclosure.
Figure 6B:
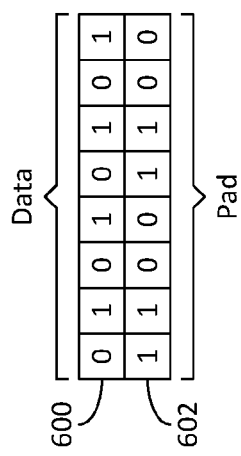
Figure 6C:
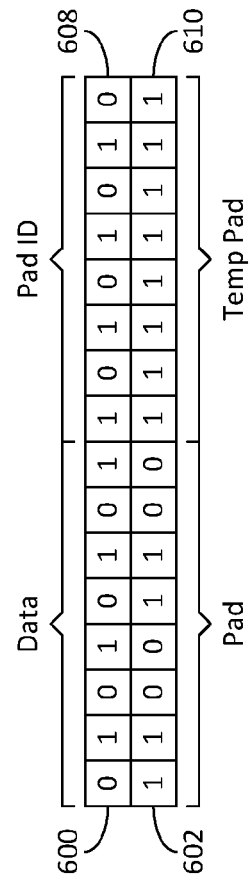
Figure 6D:
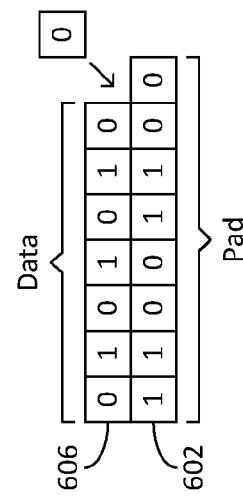

FIGS. 6A-6D show examples of a plaintext data block 600 and an exemplary pad block 602 that may be used with the wireless instruments disclosed herein. In the example of FIG. 6A, the plaintext data block 600 and the pad block 602 have the same block size. One transmission may comprise multiple such blocks as needed depending on the size of the plaintext data to be transmitted. FIG. 6B shows an example of a plaintext data block 606 that has a smaller block size than the pad block 602. In that scenario, zeros or ones may be appended to the data block 606 to conform the size thereof to the pad block 602. FIG. 6C shows an example where a pad identifier 608 is included with the data to be transmitted. As can be seen, the pad identifier 608 does not undergo OTP encryption and can therefore be extracted from the transmission without OTP decryption. Alternatively, to streamline processing, the pad identifier 608 may be OTP encrypted along with the plaintext data block 600, but using a pre-established temporary or utility pad 610, as depicted in FIG. 6D, that gets applied to all pad identifiers for both encryption and decryption.

Figure 7B:
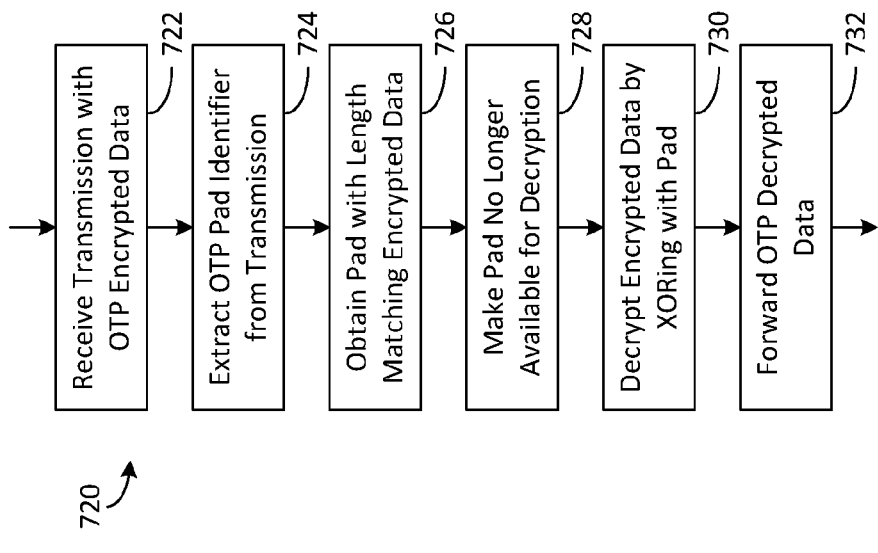
FIGS. 7A-7B are flow diagrams illustrating exemplary methods for performing OTP encryption in wireless instruments according to embodiments of the disclosure.
Figure 7A:
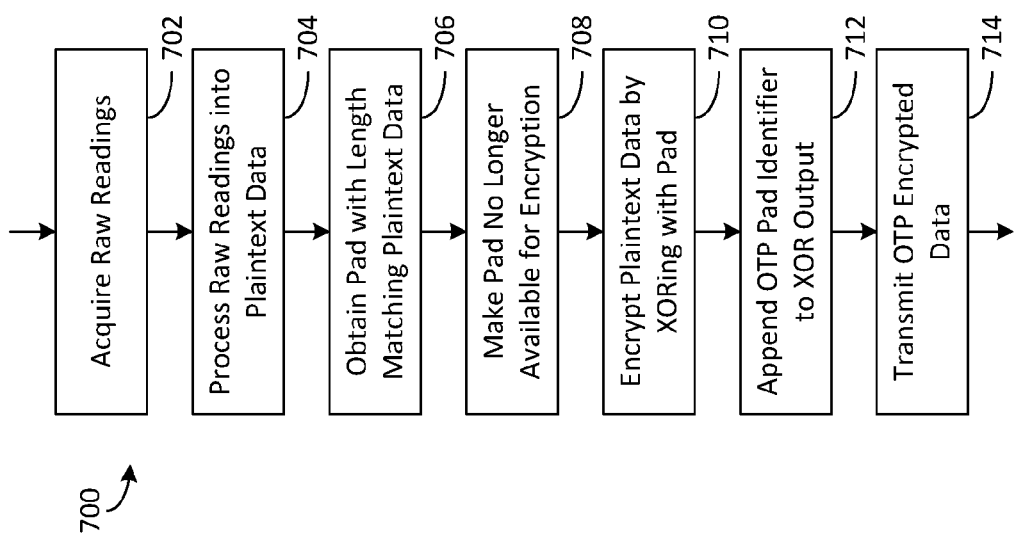

FIG. 7A shows a flow diagram of an exemplary method 700 that may be used by a wireless instrument to automatically perform OTP encryption of data transmitted by the wireless instrument. The method generally begins at block 702 where raw measurements or readings are acquired by the wireless instrument from plant machinery or equipment (e.g., a boiler). At block 704, the wireless instrument processes the raw readings into plaintext data, for example, by filtering, smoothing, and converting the raw readings from analog to digital format as needed. At block 706, the wireless instrument obtains a pad from a pad storage (e.g., solid-state memory device) having a length that matches (or is longer than) the length of the plaintext data. That pad is then designated as, or otherwise made, no longer available for encryption (e.g., by erasing the pad) at block 708 to prevent the pad from being used again for encryption. At block 710, the wireless instrument encrypts the plaintext data by XOR-ing the data with the pad obtained from block 706. As an optional measure, the wireless instrument may append a pad identifier to the encrypted data at block 712 to help identify the location of the pad in the pad storage. Thereafter, the wireless instrument transmits the OTP encrypted data to a wireless endpoint or other downstream node equipped with OTP encryption at block 714.

FIG. 7B shows a flow diagram of an exemplary method 720 that may be used by a wireless instrument to automatically perform OTP decryption of data received by the wireless instrument. The method generally begins at block 722 where the wireless instrument receives a transmission containing OTP encrypted data from an industrial wireless instrument. If the transmission includes a pad identifier, then at block 724 the wireless instrument extracts and uses the pad identifier to identify a pad location in a pad storage (e.g., solid-state memory device). At block 726, the wireless instrument obtains a pad from the pad storage having a length that matches (or is longer than) the length of the encrypted data. That pad is then designated as, or otherwise made, no longer available for decryption (e.g., by erasing the pad) at block 728 to prevent the pad from being used again for decryption. At block 730, the wireless instrument decrypts the encrypted data by XORing the data with the pad obtained from block 726. Thereafter, the wireless instrument forwards the OTP decrypted data to one or more control systems or to another downstream node at block 732.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product.

Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. An industrial wireless instrument equipped with one-time pad (OTP) encryption, comprising:
   a pad storage unit installed within the industrial wireless instrument and having a predefined plurality of one-time pads stored therein, wherein the pad storage unit is a solid-state memory device and the predefined plurality of one-time pads is stored in the solid-state memory device during manufacture of the industrial wireless instrument, the plurality of one-time pads including a sufficient number of one-time pads for the industrial wireless instrument to regularly and continuously encrypt data multiple times per day without replenishing the one-time pads over a lifetime of the industrial wireless instrument;
   a one-time pad controller configured to communicate with the pad storage unit and further configured to retrieve a one-time pad from the pad storage unit for each plaintext data to be encrypted; and
   an arithmetic unit configured to receive the plaintext data and the one-time pad from the one-time pad controller and further configured to encrypt the plaintext data using the one-time pad;
   wherein the one-time pad controller is further configured to provide the one-time pad to the arithmetic unit only once for encryption.

2. The industrial wireless instrument of claim 1, wherein the predefined plurality of one-time pads stored in the solid-state memory device is replaced or replenished only by a manufacturer of the industrial wireless instrument.

3. The industrial wireless instrument of claim 1, wherein the one-time pad controller is further operable to generate a pad identifier for the one-time pad, the pad identifier identifying a location of the one-time pad in the pad storage unit.

4. The industrial wireless instrument of claim 3, wherein the one-time pad controller is further operable to provide the pad identifier and a temporary pad for the pad identifier to the arithmetic unit.

5. The industrial wireless instrument of claim 1, wherein the arithmetic unit encrypts the plaintext data by performing an XOR process on the plaintext data using the one-time pad.

6. The industrial wireless instrument of claim 1, wherein the wireless instrument is a wireless sensor and the plaintext data represents sensor readings acquired by the wireless sensor.

7. A wireless instruments network for an industrial facility, comprising:
   a first industrial wireless instrument connected to acquire data from equipment in the industrial facility, the first industrial wireless instrument operable to encrypt the data using a first predefined set of one-time pads and to transmit the encrypted data on a regular and continuous basis over a wireless link;

a second industrial wireless instrument coupled to receive the encrypted data from the first wireless instrument on a regular and continuous basis, the second wireless instrument operable to decrypt the data using a second predefined set of one-time pads and to transmit the decrypted data on a regular and continuous basis over a wired or wireless link; and a gateway coupled to receive the decrypted data from the second industrial wireless instrument;

wherein the first predefined set of one-time pads and the second predefined set of one-time pads contain identical one-time pads and are stored in a first solid-state memory device and a second solid-state memory device, respectively, during manufacture of the first industrial wireless instrument and the second industrial wireless instrument, respectively, the first and second predefined set of one-time pads including a sufficient number of one-time pads for the first and second industrial wireless instruments to regularly and continuously encrypt and decrypt data, respectively, multiple times per day without replenishing the one-time pads over a lifetime of the first and second industrial wireless instruments.

8. The wireless instruments network of claim 7, wherein the first and second predefined set of one-time pads are replaced or replenished only by a manufacturer of the first and second industrial wireless instruments.

9. The wireless instruments network of claim 7, wherein the first wireless instrument is further operable to generate pad identifiers for the first predefined set of one-time pads, each pad identifier identifying a location of each one-time pad in the first predefined set of one-time pads.

10. The wireless instruments network of claim 9, wherein the second wireless instrument receives the pad identifiers with the encrypted data from the first wireless instrument and is further operable to locate the one-time pads in the second predefined set of one-time pads using the pad identifiers.

11. The wireless instruments network of claim 7, wherein the first wireless instrument is a wireless sensor and the encrypted data represents sensor readings acquired by the wireless sensor, and the second wireless instrument is a wireless endpoint.

12. The wireless instruments network of claim 11, further comprising a third wireless instrument between the first and second wireless instruments, the third wireless instrument relaying the encrypted data between the first and second wireless instruments on a regular and continuous basis.

13. The wireless instruments network of claim 7, wherein the first and second wireless instruments are operable to encrypt and decrypt the data, respectively, by performing an XOR process on the data using the one-time pads.

14. A method of performing one-time pad (OTP) encryption in an industrial facility, comprising:

acquiring data from equipment in the industrial facility at a first industrial wireless instrument;

encrypting the data at the first industrial wireless instrument using a first predefined set of one-time pads;

transmitting the encrypted data on a regular and continuous basis over a wireless link;

receiving the encrypted data from the first wireless instrument at a second industrial wireless instrument on a regular and continuous basis;

decrypting the data at the second wireless instrument on a regular and continuous basis using a second predefined set of one-time pads; and transmitting the decrypted data on a regular basis over a wired or wireless link to a gateway;

wherein the first predefined set of one-time pads and the second predefined set of one-time pads contain identical one-time pads and are stored in a first solid-state memory device and a second solid-state memory device, respectively, during manufacture of the first industrial wireless instrument and the second industrial wireless instrument, respectively, the first and second predefined set of one-time pads including a sufficient number of one-time pads for the first and second industrial wireless instruments to regularly and continuously encrypt and decrypt data, respectively, multiple times per day without replenishing the one-time pads over a lifetime of the first and second industrial wireless instruments.

15. The method of claim 14, further comprising storing the first and second predefined set of one-time pads in a first solid-state memory device and a second solid-state memory device, respectively, the first and second solid-state memory devices being securely installed in the first and second wireless instruments, respectively.

16. The method of claim 14, further comprising generating pad identifiers for the first predefined set of one-time pads at the first wireless instrument, each pad identifier identifying a location of each one-time pad in the first predefined set of one-time pads.

17. The method of claim 16, further comprising receiving the pad identifiers with the encrypted data from the first wireless instrument at the second wireless instrument receives and locating the one-time pads in the second predefined set of one-time pads using the pad identifiers.

18. The method of claim 14, wherein the first wireless instrument is a wireless sensor and the encrypted data represents sensor readings acquired by the wireless sensor, and the second wireless instrument is a wireless endpoint.

19. The method of claim 14, further comprising a third wireless instrument between the first and second wireless instruments, the third wireless instrument relaying the encrypted data between the first and second wireless instruments on a regular and continuous basis.

20. The method of claim 14, wherein the first and second wireless instruments encrypt and decrypt the data, respectively, by performing an XOR process on the data using the one-time pads.

* * * * *